United States Patent [19]
Watanabe

[11] Patent Number: 6,154,288
[45] Date of Patent: *Nov. 28, 2000

[54] PRINTER AND IMAGE PROCESSING METHOD FOR ADJUSTING PRINTING CRITERIA TO COMPENSATE FOR LOW/HIGH DENSITY IMAGES

[75] Inventor: Koichi Watanabe, Saitama, Japan

[73] Assignee: Fuji Photo Film Co. Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/965,864

[22] Filed: Nov. 7, 1997

[30] Foreign Application Priority Data

Nov. 8, 1996 [JP] Japan ................................. 8-296965
Oct. 27, 1997 [JP] Japan ................................. 9-294060

[51] Int. Cl.$^7$ ..................................................... G06F 15/00
[52] U.S. Cl. ........................... 358/1.9; 358/522; 358/521
[58] Field of Search ............................. 395/109; 382/168, 382/169, 167, 254, 274, 162; 358/522, 521, 519, 456, 298, 532, 534–536, 1.9, 1.1, 1.2, 1.4, 1.18, 518, 520, 429, 455–459, 465–466; 347/183, 188

[56] References Cited

U.S. PATENT DOCUMENTS

| | | | |
|---|---|---|---|
| 4,777,536 | 10/1988 | Kato | 358/298 |
| 4,843,471 | 6/1989 | Yazawa et al. | 348/716 |
| 5,042,077 | 8/1991 | Burke | 382/169 |
| 5,156,468 | 10/1992 | Uematsu | 400/68 |
| 5,250,959 | 10/1993 | Yamada et al. | 347/132 |
| 5,426,517 | 6/1995 | Schwartz | 358/520 |
| 5,512,928 | 4/1996 | Kato et al. | 347/138 |
| 5,542,003 | 7/1996 | Wofford | 382/169 |
| 5,668,890 | 9/1997 | Winkelman | 382/167 |

FOREIGN PATENT DOCUMENTS 61-157191  7/1986  Japan.

OTHER PUBLICATIONS

Kim, Yeong–Taeg, "Contrast Enhancement Using Brightness Preserving Bi–Histogram Equalization", Feb. 1997, pp. 1–7.

*Primary Examiner*—Dov Popovici

[57] ABSTRACT

Luminance levels of an analog or digital image signal entered from outside are detected as a luminance histogram. Based on the luminance histogram, a black luminance level and a white luminance level are determined, and are assigned respectively to a darkest tonal level and a lightest tonal level of a gradation range available for printing. To those pixels having luminance levels between the black and white levels, tonal levels between the darkest and lightest tonal levels are assigned according to a gradation conversion curve. The gradation conversion curve is selected among from a plurality of predetermined conversion curves depending upon a scene discrimination coefficient. The scene discrimination coefficient is calculated by multiplying the frequency of each luminance level shown in the luminance histogram with a different luminance coefficient predetermined according to the luminance level, and accumulating multiplication results of all the luminance levels.

15 Claims, 10 Drawing Sheets

PRINTER AND IMAGE PROCESSING METHOD FOR ADJUSTING PRINTING CRITERIA TO COMPENSATE FOR LOW/HIGH DENSITY IMAGES

BACKGROUND OF THE INVENTION

1. Field of the Invention

The present invention relates to a printer which prints a half-tone image on a recording material based on image signal entered through an image input device. The present invention relates also to an image processing method for processing the image signal to produce optimum recording data in view of recording characteristics of the printer and the recording material.

2. Background Arts

A video printer has been known, which receives image signal, e.g. analog color video signal or digital image signal, from an external device, and prints a full-color half-tone image on a recording material based on the image signal. When the image signal is analog video signal, it is converted frame by frame into digital three color (RGB) image data, or into luminance and chrominance data. The digital image data is processed into recording data for yellow, magenta and cyan. A recording head of the printer is driven in accordance with the recording data.

Since the dynamic range of the tone reproduction curve of the printer is narrower than the signal dynamic range of the video signal, without any correction, dark areas of the scene tend to be darker in the printed hard copy in comparison with the video image displayed on a screen. For the same reason, light areas of the scene tend to be lighter in the hard copy compared with the video image.

As a gradation correction method, it is known to determine an appropriate low luminance level as a black level and an appropriate high luminance level as a white level within a luminance range of the image signal, and assign luminance levels between the black level to the white levels respectively to gray levels between maximum and minimum densities available for recording, in accordance with the following gradation conversion formula:

$$D=(Dz-D0)\cdot(Da-Sb)/(Dw-Db)+D0$$

wherein
Dw is the white level;
Db is the black level;
Da is a luminance level of the image signal, $Db \leq Da \leq Dw$;
Dz is a luminance level corresponding to the minimum recording density;
D0 is a luminance level corresponding to the maximum recording density; and
D is a luminance level corresponding to a gray level to which the luminance level Da is assigned, $D0 \leq D \leq Dz$.

This method cannot sufficiently correct the above described problem when the luminance distribution is biased toward low luminance side, i.e. lowkey image, or high luminance side, i.e. highkey image.

In another conventional gradation conversion method, as disclosed in JPA 61-157191 for example, a luminance histogram of the image signal is detected, and in accordance with the frequency distribution of the luminance histogram, a gradation conversion curve is selected which allots more tonal steps to those luminance levels having larger frequencies. This method is known as histogram flattening.

According to the histogram flattening method, if the image includes a portion where the luminance varies gradually over a wider range, gradation smoothness of that portion would be deteriorated, because the tone changes steeply in the density range corresponding to the high frequency luminance levels, while the tone changes little outside the density range corresponding to the high frequency luminance levels. Therefore, the histogram flattening is not suitable for reproducing natural tone images.

In addition, there are differences in luminance range between input image signals according to the image input device. For example, the luminance signal level for white of the video signal can correspond to 100 IRE or 140 IRE. As for the black level, the luminance signal level varies depending upon whether the image input device has a setup function or not. The same applies to digital image data entered through a computer or the like.

The difference in the luminance range of the input image signal has an amplified effect on the tone reproduction of the hard copy. The conventional histogram flattening method can not eliminate the bad effect of the luminance range difference between the image signals.

SUMMARY OF THE INVENTION

To achieve the above object, the present invention provides a printer which prints a half-tone image on a recording material based on image signal, i.e. analog or digital image signal entered through an image input device, and which processes the image signal according to the following steps:

producing a luminance histogram showing frequencies of respective luminance levels from the image signal;

determining a black luminance level and a white luminance level based on the luminance histogram;

assigning the black luminance level and the white luminance level respectively to a darkest tonal level and a lightest tonal level of a gradation range available for printing;

multiplying the frequency of each luminance level with a different luminance coefficient predetermined according to the luminance level;

accumulating multiplication results of all the luminance levels to use the accumulation result as a scene discrimination coefficient;

determining a gradation conversion curve depending upon the scene discrimination coefficient; and assigning the respective luminance levels of the image signal to tonal levels ranging from the darkest tonal level to the lightest tonal level in accordance with the gradation conversion curve.

According to a preferred embodiment of the invention, a value proportional to a difference between the black luminance level and each luminance level is used as the luminance coefficient for those luminance levels ranging from the black luminance level to the white luminance level, and a value proportional to a difference between the black luminance level and the white luminance level is used as the luminance coefficient for those luminance levels above the white luminance level, whereas zero is used as the luminance coefficient for those luminance levels below the black luminance level.

When the scene discrimination coefficient is within a predetermined range, it means that the image to print has an average luminance distribution. In that case, the gradation conversion is carried out according to a linear conversion curve, thereby the tonal steps are equally allotted throughout the entire density range.

When the scene discrimination coefficient is below the predetermined range, it means that the image to print is so dark that tone reproduction in high density range would be inadequate. In that case, the gradation conversion is carried out according to a non-linear conversion curve which shifts the tonal levels between the black and white luminance levels toward lower density side, while allotting more tonal steps to higher density range.

When the scene discrimination coefficient is above the predetermined range, it means that the image to print is so light that tone reproduction in low density range would be inadequate. In that case, the gradation conversion is carried out according to a non-linear conversion curve which shifts the tonal levels between the black and white luminance levels toward higher density side, while allotting more tonal steps to lower density range.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
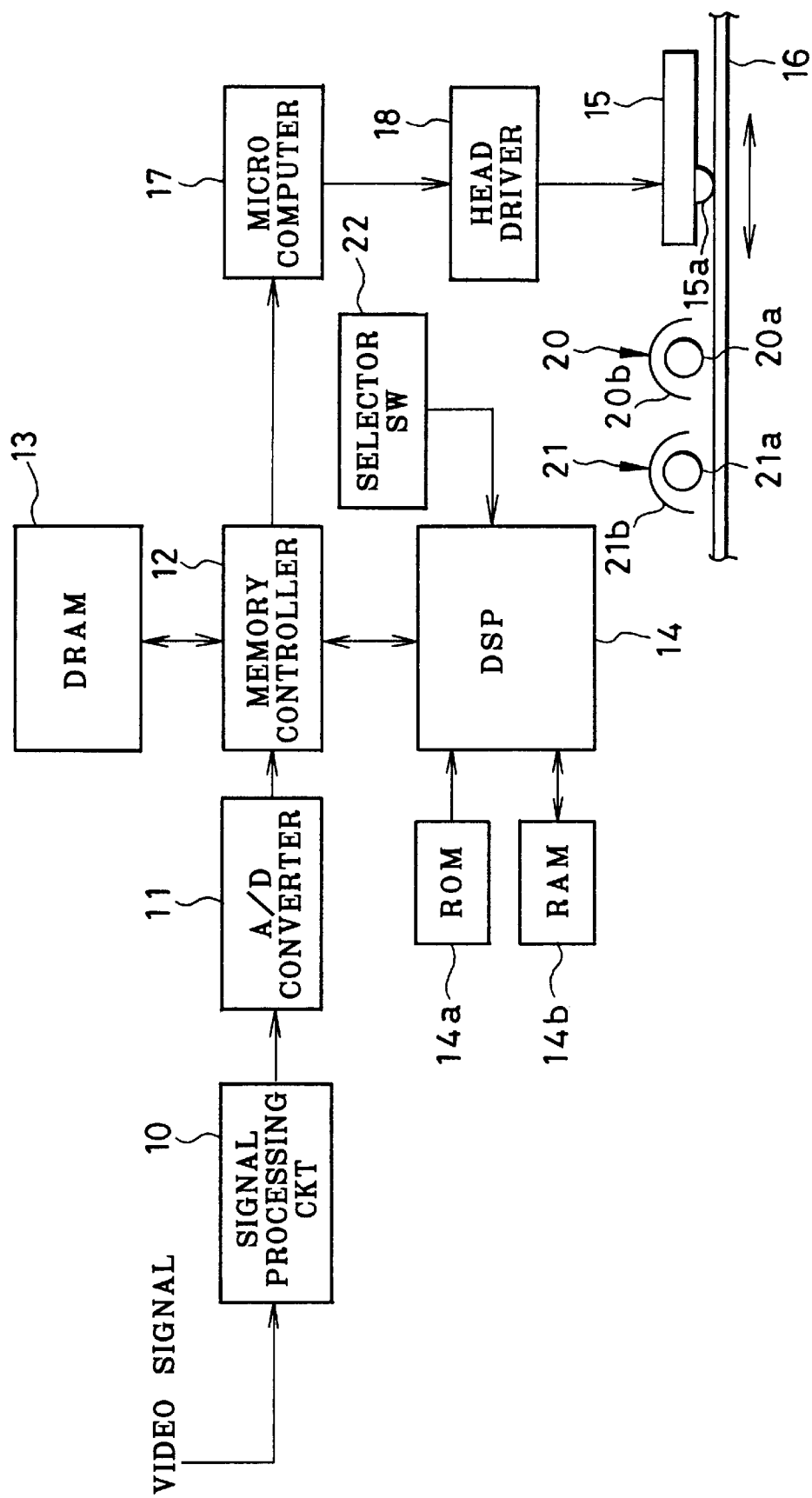
FIG. 1 is a schematic diagram showing the overall construction of a printer embodying the present invention.

FIG. 1 shows a printer, which records full-color half-tone images on color recording paper 16 based on a color video signal entered through an image input device (not shown), such as a video camera, a video player or the like. The color video signal is a well-known analog composite color signal composed of luminance signal (Y), chrominance signal (C), and synchronizing signals. From the entered analog color video signal, a signal processing circuit 10 produces luminance signal (Y) and color difference signal for red (CR=R−Y), and color difference signal for blue (CB=B−Y).

The analog signals from the signal processing circuit 10 are converted into digital data through an A/D converter 11. The A/D converter 11 samples the luminance signal at a sampling frequency of 4 fsc, which is quadruple the sub-carrier frequency fsc of the chrominance signal, to section one frame into 712×448 pixels, and then produces luminance data of 8 bits per pixel. The A/D converter 11 samples the color difference signals for red and for blue at a sampling frequency of 2 fsc, which is double the sub-carrier frequency fsc, to section one frame into 356×448 pixels, and then produces color difference data of 8 bits per pixel, respectively.

The luminance data has a value proportional to the level of the corresponding luminance signal. For example, for a luminance signal level of "0" on IRE scale, the luminance data has a value "0" in decimal notation, and for a luminance signal level of "150" on IRE scale, the luminance data has a value "255" in decimal notation. The color difference data also has a value proportional to the level of the corresponding color difference signal, such that the color difference data has a value "128" in decimal notation for the color difference signal of either color when the pixel is representative of neutral gray. The luminance data and the color difference data are sent to a memory controller 12.

The memory controller 12 is connected to DRAM 13 and DSP (Digital Signal Processor) 14. The memory controller 12 writes the luminance data and the color difference data of one full-color half-tone image in the DRAM 13. When printing the image, the memory controller 12 transfers the luminance data and the color difference data from the DRAM 13 to the DSP 14. The DSP 14 sequentially produces recording data for yellow, magenta and cyan from the luminance data and the color difference data.

The DSP 14 is connected to ROM 14a and RAM 14b. The ROM 14a stores a plurality of conversion tables for gradation modification and a plurality of conversion tables for gamma correction in addition to programs for sequential operation of the DSP 14. The RAM 14b is served as a working area for temporary storage of data necessary for processing in the DSP 14. As will be described in detail later, the DSP 14 selects one of the gradation conversion tables depending upon luminance distribution of the input image, for gradation modification to improve the tone reproduction of the image. In addition, the DSP 14 selects one of the gamma conversion tables according to the type of recording paper 16, for adjustment to the coloring characteristics of the recording paper 16 used.

Figure 2:
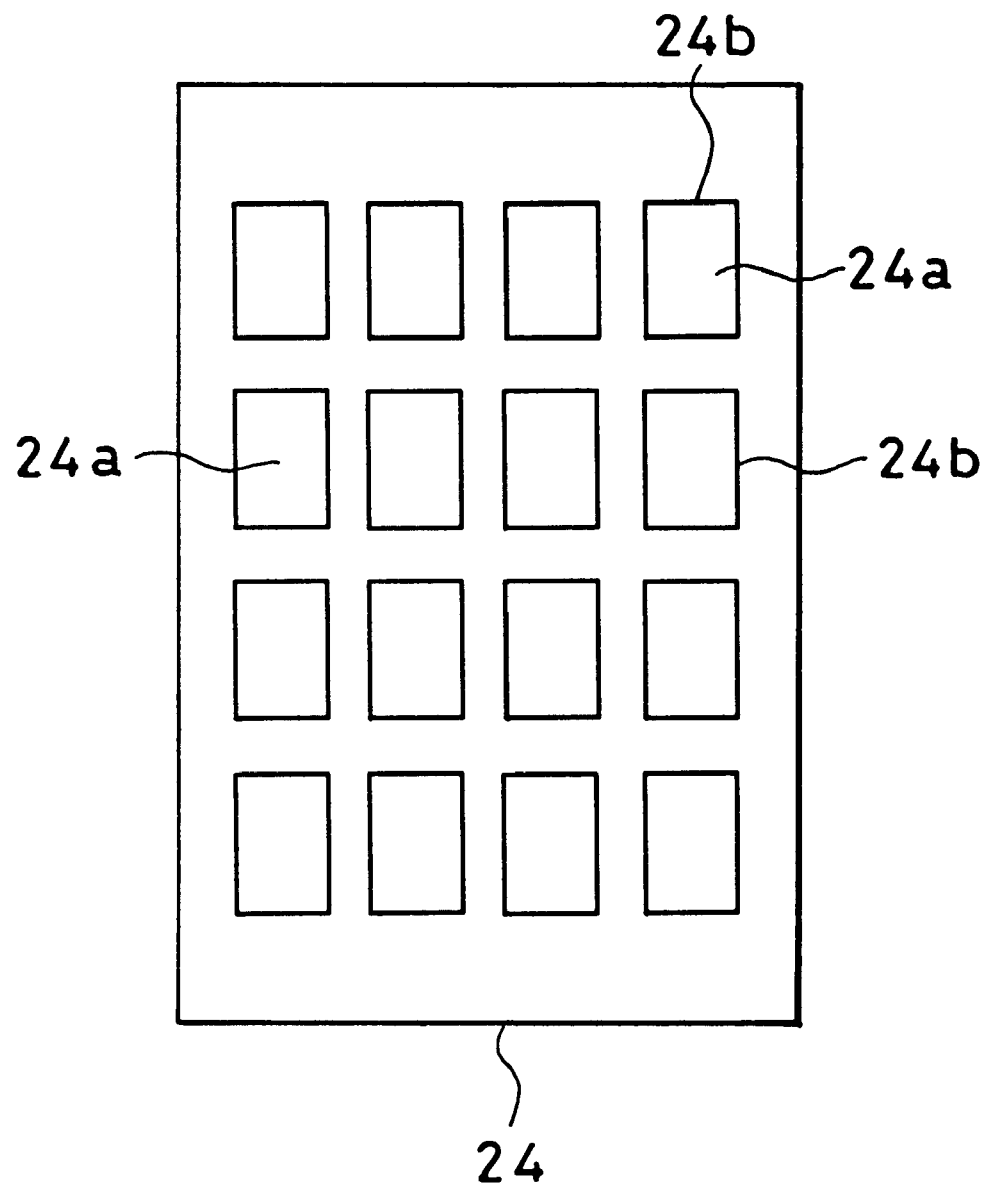
FIG. 2 is an explanatory view of a seal-type thermosensitive recording sheet.

A manually operable selector switch 22 is connected to the DSP 14, for selecting a recording paper type among several options. In this embodiment, it is possible to designate standard color thermosensitive recording paper or seal-type thermosensitive recording sheet as the recording paper 16. As shown for example in FIG. 2, a seal-type recording sheet 24 has a matrix of seal segments 24a, each of which can be individually peeled off and stuck to something. When the seal-type recording sheet 24 is selected as the recording paper 16, the DSP 14 processes the data of the input image to produce a composite image consisting of identical images which are reduced in size and arranged in a 4×4 matrix in correspondence with the seal segments 24a, in order to print the small size identical images on the individual seal segments 24a.

The recording data produced by processing the luminance data and the color difference data is sent from the DSP 14 to a head driver 18, line after line through the memory controller 12 and a microcomputer 17. In accordance with the recording data, the head driver 18 drives a thermal head 15 to record yellow, magenta and cyan frames in a frame sequential fashion. The microcomputer 17 controls the head driver 18, the thermal head 15, a yellow optical fixing device 20, a magenta optical fixing device 21 and a paper transport mechanism (not shown).

The standard color thermosensitive recording paper has thermosensitive coloring layers for cyan, magenta and yellow formed on atop another on a base material. The most obverse or top coloring layer has the highest thermosensitivity, and is colored first among the three coloring layers. The yellow coloring layer is optically fixed by electromagnetic rays of 420 nm, and the cyan coloring layer is optically fixed by electromagnetic rays of 365 nm.

The seal-type thermosensitive recording sheet 24 has fundamentally the same construction as the standard color thermosensitive recording paper, except that an adhesive layer is formed on the reverse side of the base material, and the base material is supported on a releasing paper. The seal segments 24a are bounded by half-cut slits 24b to permit peeling off the releasing paper.

The coloring characteristics are different between the standard color thermosensitive recording paper and the seal-type color thermosensitive recording sheet, because of difference in thickness of the respective coloring layers, and other factors. Therefore, the ROM 14a stores a different gamma conversion table for the seal-type color thermosensitive recording sheet from that for the standard color thermosensitive recording paper. The DSP 14 selects a suitable gamma conversion table in accordance with the paper type designated through the selector switch 22.

In this embodiment, the recording paper 16 has the yellow coloring layer on the top, and the cyan coloring layer on the bottom may be used as the recording paper 16, so the recording is performed in the sequence of yellow, magenta and cyan.

The yellow optical fixing device 20 consists of a lamp 20a radiating electromagnetic rays having a peak at about 420 nm, and a reflector 20b for projecting the electromagnetic rays toward the color thermosensitive recording paper 16, to fix the yellow coloring layer. The magenta optical fixing device 21 consists of a lamp 21a radiating electromagnetic rays having a peak at about 365 nm, and a reflector 21b for projecting the electromagnetic rays toward the color thermosensitive recording paper 16, to fix the magenta coloring layer.

The thermal head 15 has a heating element array 15a consisting of a great number of heating elements. The head driver 18 drives the thermal head 15, to heat the heating elements 15a by different amounts depending upon the recording data of one line, to record a line of color dots at different densities. Synchronously with the recording of one line, the thermosensitive recording paper 16 is transported from the thermal head 15 toward the optical fixing devices 20 and 21, so each color frame is recorded line by line. The yellow coloring layer with the yellow frame recorded therein is fixed by the yellow optical fixing device 20. Thereafter, the thermosensitive recording paper 16 is transported backward, to record the magenta frame. The magenta coloring layer with the magenta frame recorded therein is fixed by the magenta optical fixing device 21. Thereafter, the thermosensitive recording paper 16 is transported backward, to record the cyan frame.

Now the operation of the DSP 14 will be described.

To produce recording data, the DSP 14 produces RGB data from the luminance data and the color difference data, hereinafter called RGB calculation, and converts the RGB data into data of complementary colors, i.e. yellow to blue, magenta to green, and cyan to red. Hereinafter, this conversion process will be called complementary color conversion, and the data for yellow, magenta and cyan obtained from the complementary color conversion of the RGB data is called primary data. It is to be noted that the RGB data and the primary data consist of 8 bits per pixel, like the luminance data and the color difference data, and any data processed or produced by the DSP 14 consists of 8 bits per pixel.

Figure 3:
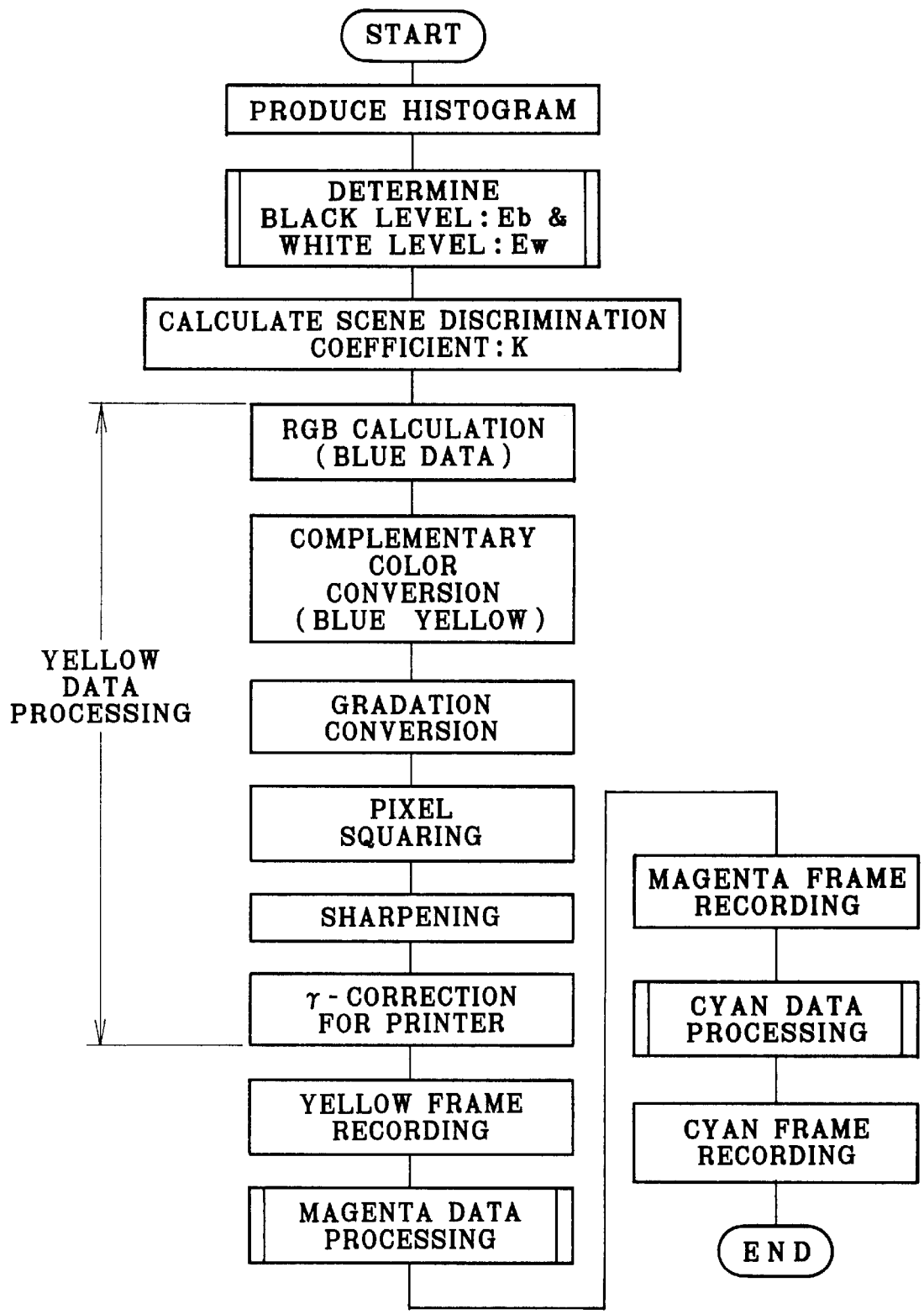
FIG. 3 is a flow chart illustrating the sequence of printing a fullcolor image.

As shown in FIG. 3, the recording data for yellow, magenta and cyan is produced from the primary data of the respective colors in the frame sequential fashion. Prior to the RGB calculation for the blue data, the DSP 14 calculates a scene discrimination coefficient K which is used for gradation conversion of the primary data.

To calculate the scene discrimination coefficient K, the DSP 17 reads out luminance data of 600×400 pixels among the luminance data of 712×442 pixels stored in the DRAM 13, the 600×400 pixels being located in a central area of the image. The DSP 17 produces a luminance histogram from the luminance data of the central 600×400 pixels by counting the number of pixels having the same luminance level. To extract the luminance data of the central area is to eliminate bad influence from a black frame or white margins which can exist in a boundary area of the image picked up in the DRAM 13. Hereinafter, HY[Ey] represents the number of pixels counted up for each luminance level Ey, Ey=0 to 255, i.e. the frequency of each luminance level Ey. The frequency distribution shown by the luminance histogram corresponds to the luminance distribution of the picked up image.

Figure 4:
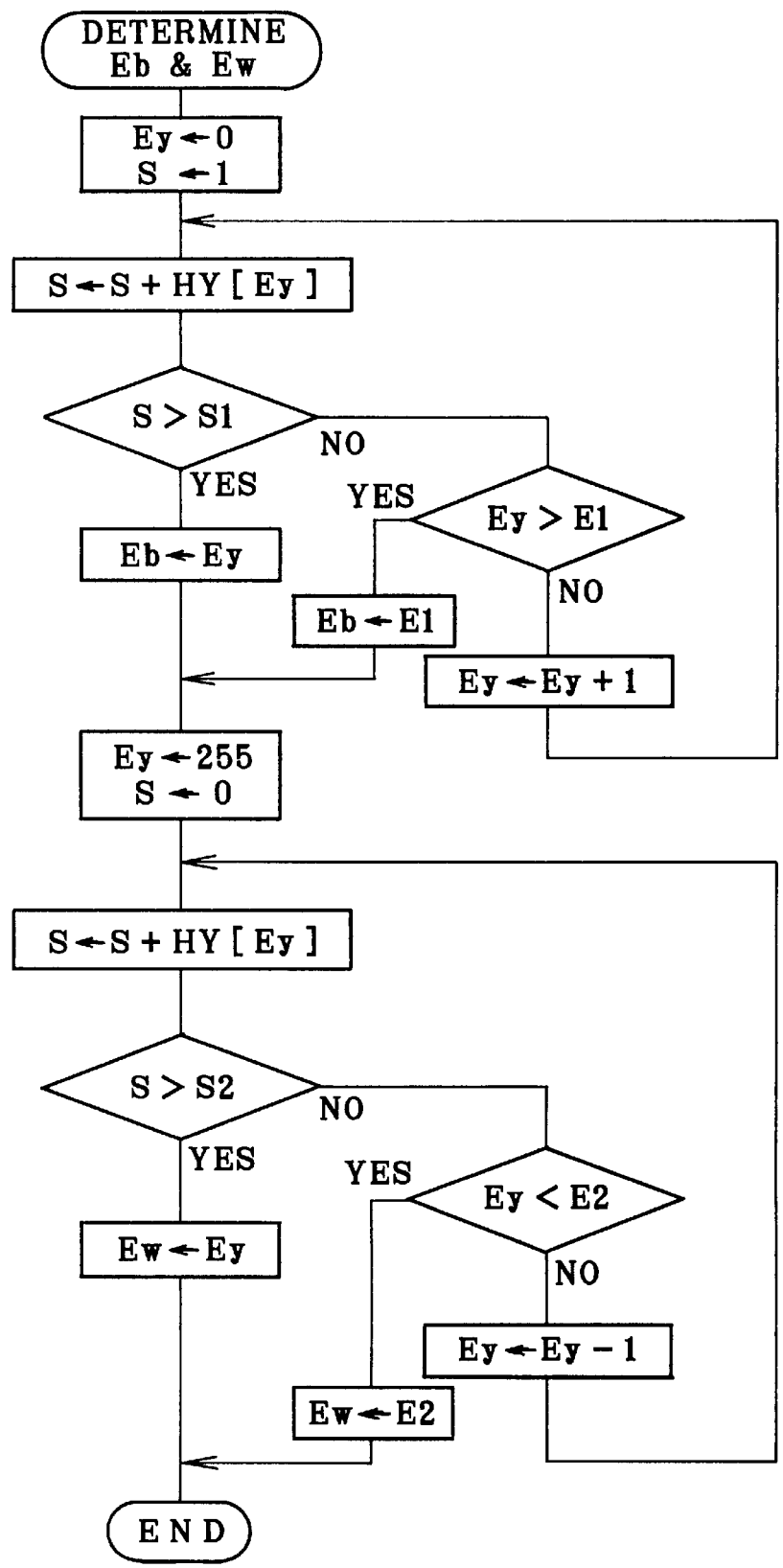
FIG. 4 is a flow chart illustrating the operation sequence for determining a black luminance level and a white luminance level.

Thereafter, the DSP 14 accumulates the frequencies HY[Ey] in order to determine a black luminance level Eb and a white luminance level Ew in the sequence as shown in FIG. 4. The black level Eb is a luminance level to be assigned to an available maximum recording density, i.e. a darkest tonal level of an available gradation range. On the other hand, the white level Ew is a luminance level to be assigned to a minimum recording density, i.e. a lightest tonal level of the available gradation range.

Specifically, to determine the black level Eb, the frequencies HY[Ey] are accumulated one after another in the order from the level Ey=0, i.e. HY[0]+ HY[1]+ . . . When the accumulation result or cumulative frequency S goes above a given value S1, e.g. S1=600, the luminance level Ey having the just accumulated frequency HY[Ey] is determined to be a black level Eb. Thereafter, the frequencies HY[Ey] are accumulated one after another in the order from the level Ey=255, i.e. HY[255]+HY[254]+ . . . When the accumulation result S goes above a given value S2, e.g. S2=200, the luminance level Ey having the just accumulated frequency HY[Ey] is determined to be a white level Ew.

However, if a black level Eb determined with reference to the given value S1 is more than a given luminance level E1, the black level Eb is corrected to the given luminance level E1. If a white level Ew determined with reference to the given value S2 is less than a given luminance level E2, the white level Ew is corrected to the given luminance level E2. For example, E1=18 and E2=182. Thereby, on the IRE scale, the black level is set at 10 IRE if the calculated black level is more than 10 IRE, whereas the white level s set at 107 IRE if the calculated white level is less than 107 IRE. This is effective to prevent over-correction in case the picked up image is extremely biased in luminance distribution, e.g. where there is no high light portion or no dark portion, or where almost whole area is in the middle luminance range. The values S1, S2, E1 and E2 are not limited to the above examples.

After determining the black level Eb and the white level Ew, the DSP 14 calculates a scene discrimination coefficient K by multiplying the respective frequencies HY[Ey] with luminance coefficients specific to the individual luminance levels Ey, and by adding up the multiplication products. Specifically, the scene discrimination coefficient K is calculated according to the following formulas:

$$SUM1 = \Sigma\{HY[Ey]\cdot(Ey-Eb)\} \quad (1)$$

wherein $Eb \leq Ey \leq Ew$;

$$SUM2 = \Sigma\{HY[Ey]\cdot(Ew-Eb)\} \quad (2)$$

wherein $Ew+1 \leq Ey \leq 255$;

$$K = 2\cdot(SUM1+SUM2)/\{(Ew-Eb)\cdot Cp\} \quad (3)$$

wherein Cp represents the total number of pixels used for producing the histogram. In this embodiment, Cp=600×400.

Consequently, for those luminance levels Ey ranging from the black level Eb to the white level Ew, a value proportional to the difference between the individual luminance level and the black level Eb is used as the luminance coefficient: $2\cdot(Ey-Eb)/\{(Ew-Eb)\cdot Cp\}$. On the other hand, for each of those luminance levels Ey above the white level Ew, a value proportional to the difference between the black level Eb and the white level Ew is used as the luminance coefficient: $2\cdot(Ew-Eb)/\{(Ew-Eb)\cdot Cp\}$. For each of those luminance levels Ey below the black level Eb, "0" is used as the luminance coefficient, so that these dark levels below the black level Eb have no effect on the scene discrimination coefficient K.

The scene discrimination coefficient K obtained in this way represents the tendency of luminance distribution of the picked up image. The scene discrimination coefficient K gets closer to "1", as an average luminance level of the picked up image is closer to an average between the black and white levels Eb and Ew. That is, the scene discrimination coefficient K gets to "1", when the luminance distribution is flat and uniform, or when the distribution curve is symmetrical about a peak near the average level between the black and white levels Eb and Ew, or when there is a peak on either of the low luminance side and the high luminance side. Hereinafter, these luminance distribution conditions whose average luminance level is closer to an average between the black and white levels Eb and Ew will be referred to as an average luminance distribution. When the luminance distribution is biased toward the high luminance side, the scene discrimination coefficient K is greater than "1". When the luminance distribution is biased toward the low luminance side, the scene discrimination coefficient K is less than "1"

After the discrimination coefficient K is obtained, the DSP 14 starts a yellow data processing for producing yellow recording data. The DSP 14 reads out the luminance data and the red and blue color difference data of the first line from the DRAM 13, and produces blue data of each pixel in the first line by the RGB calculation using the following equation, which concurrently effects a masking process considering the coloring components of the yellow coloring layer of the color thermosensitive recording paper 16:

$$B=Ya+(2.03-1.297)\cdot CBa+(1.14-0.06)\cdot CRa \quad (4)$$

wherein
Ya=(Y−Eb)·(255/Ew−Eb);
CBa=(CB−128)·(255/Ew−Eb);
CRa=(CR−128)·(255/Ew−Eb);
B is a blue data value of one pixel;
Y is a luminance data value (=Ey) of one pixel;
CB is a blue color difference data value of one pixel;
CR is a red color difference data value of one pixel.

Since the sampling frequency for the color difference data is half the sampling frequency for the luminance data, the number of blue color difference data values CB per line as well as the number of red color difference data values CR per line are half the number of values Y(=Ey) per line, i.e. 356:712 in this embodiment. Therefore, for the RGB calculation, the same values CB and CR are used twice in combination with the values Y of two adjacent pixels, to obtain the blue data for the two adjacent pixels.

If the masking process is not necessary, the blue data of each pixel is calculated according to the following equation:

$$B=Ya+2.03\cdot CBa+0\cdot CRa \quad (4')$$

Through the RGB processing as above, the blue data of those pixels whose luminance levels belong to the range from the black level Eb to the white level Ew are correspondingly ranked into gray levels or tonal levels of "0" to "255". In this way, the 256 tonal levels are fully utilized for recording in spite of the difference in luminance signal range between the image input devices.

Thereafter, the DSP 14 converts the blue data of the first line into primary yellow data of the first line through the complementary color conversion according to the following equation:

$$YEa=255-B \quad (5)$$

wherein YEa is a primary yellow data value of one pixel.

The primary yellow data of the first line is stored in the RAM 14b. Then, the DSP 14 selects, based on the previously calculated scene discrimination coefficient K, one of first to ninth gradation conversion tables which are previously stored in the ROM 14a. The DSP 14 reads out the primary yellow data of one pixel after another from the RAM 14b, and subjects the primary data to the gradation conversion using the selected gradation conversion table, to obtain secondary yellow data.

Figure 5A:
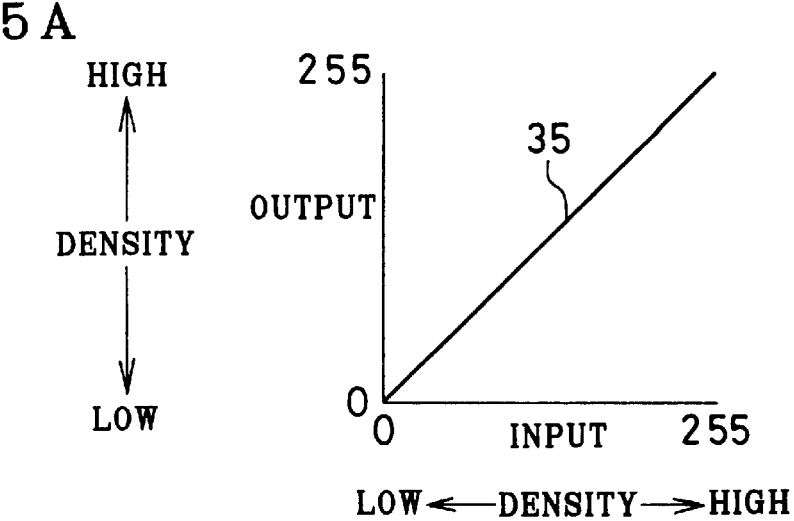
FIGS. 5A, 5B and 5C are graphs illustrating gradation conversion curves corresponding to gradation conversion tables according to an embodiment of the invention.
Figure 5B:
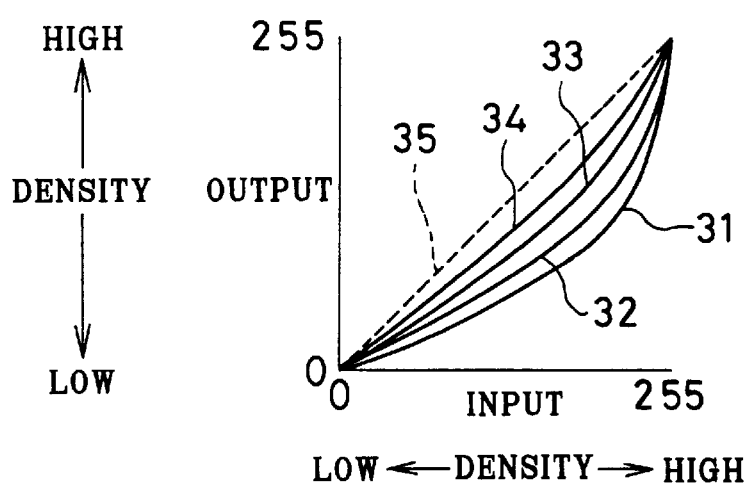
Figure 5C:
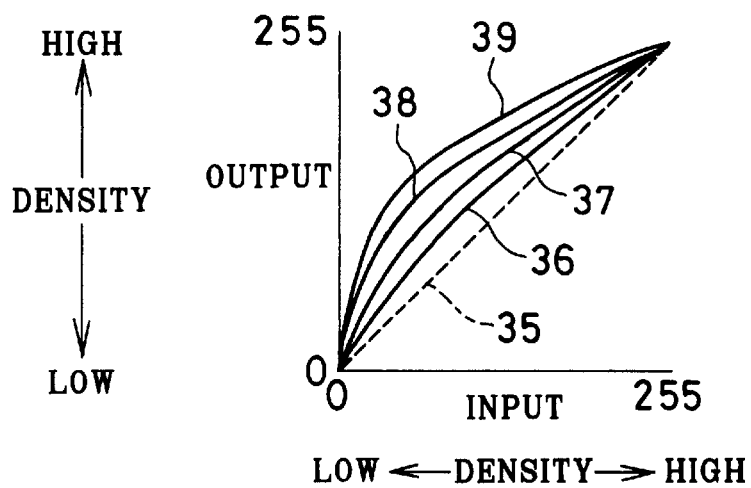

FIGS. 5A, 5B and 5C show gradation conversion curves 31, 32, 33, 34, 35, 36, 37, 38 and 39 corresponding to the first to ninth gradation conversion tables respectively, wherein the horizontal axis represents input tonal levels or values D1 of the primary data, and whereas the vertical axis represents output tonal levels or values D2 of the secondary data.

The values or tonal levels D2 are made equal to the values or tonal levels D1 of the primary data. That is, D2=D1. Accordingly, the fifth gradation conversion table is selected for those images having the average luminance distribution. In this embodiment, when the scene discrimination coefficient K is not less than 0.80 and less than 1.08, the fifth gradation conversion table is selected.

When the scene discrimination coefficient K is less than 0.80, it means that the luminance distribution of the picked up image is biased toward the low luminance side. Without any gradation conversion, the reproduced image would be too dark and the tone reproduction in high density range or dark areas of the scene would be inadequate. Therefore, when the scene discrimination coefficient K is less than 0.80, one of the first to fourth gradation conversion tables is selected. As shown by the curves 31 to 34 in FIG. 5B, the first to fourth gradation conversion tables are designed to shift the entire tone to the low density side (=high luminance side), and assign more tonal steps to pixels of high density range (=pixels of lower luminance levels). Thereby, the entire density of the reproduced image is lowered, and the tone reproduction in the dark area is improved.

When the scene discrimination coefficient K is not less than 1.80, it means that the luminance distribution of the picked up image is biased toward the high luminance side. Without any gradation conversion, the reproduced image would be too light and the tone reproduction in low density range or light areas of the scene would be inadequate. Therefore, when the scene discrimination coefficient K is not less than 1.80, one of the sixth to ninth gradation conversion tables is selected. As shown by the curves 36 to 39 in FIG. 5C, the sixth to ninth gradation conversion tables are designed to shift the entire tone to the high density side (=low luminance side), and assign more tonal steps to pixels of low density range (=pixels of higher luminance levels). Thereby, the entire density of the reproduced image is increased, and the tone reproduction in the light areas is improved.

The more the image is biased toward the low luminance side, the lower the scene discrimination coefficient K becomes. The more the image is biased toward the high luminance side, the higher the scene discrimination coefficient K becomes. Consequently, one of the first to ninth gradation conversion tables is selected based on the scene discrimination coefficient K according to the following relationships:

K<0.58→the first gradation conversion table;

0.58≦K<0.64→the second gradation conversion table;

0.64≦K<0.71→the third gradation conversion table;

0.71≦K<0.80→the fourth gradation conversion table;

0.80≦K<1.08→the fifth gradation conversion table;

1.08≦K<1.20→the sixth gradation conversion table;

1.20≦K<1.25→the seventh gradation conversion table;

1.25≦K<1.30→the eighth gradation conversion table;

1.30≦K→the ninth gradation conversion table.

The relationship between the tonal levels D1 of the primary data and the tonal levels D2 of the secondary data obtained by use of the first to fourth gradation conversion tables may be expressed by the following equation:

$$D2=255-f(255-D1) \quad (6)$$

wherein $$f(x)=(x/255)^g \cdot 255$$

g=0.81 for the first gradation conversion table;

g=0.85 for the second gradation conversion table;

g=0.88 for the third gradation conversion table;

g=0.92 for the fourth gradation conversion table.

The relationship between the tonal levels D1 of the primary data and the tonal levels D2 of the secondary data obtained by use of the sixth to ninth gradation conversion tables may be expressed by the following equation:

$$D2=(D1/255)^g \cdot 255 \quad (7)$$

wherein g=0.93 for the sixth gradation conversion table g=0.88 for the seventh gradation conversion table g=0.84 for the eighth gradation conversion table g=0.80 for the ninth gradation conversion table After the gradation conversion, the DSP 14 processes the secondary yellow data of the first line for pixel squaring in order to record each pixel in a square area on the recording paper 16. Hereinafter the data obtained by the pixel squaring will be referred to as tertiary data. Since the luminance data consists of 712×448 pixels in this instance, the 712 values of one line of the secondary data are converted into 610 values through the pixel squaring, and the 610 values are assigned to respective pixels of one line to record. Thus, 610×448 pixels constitute each color frame to record. Specifically, the pixel squaring is performed according to the following formulas, wherein $YEb_0$, $YEb_1$, $YEb_2$, $YEb_3$, . . . $YEb_6$ represent the values of every seven successive pixels of one line of the secondary yellow data, whereas $YEc_0$, $YEc_1$, $YEc_2$, $YEc_3$, . . . $YEc_5$ represent the values of every six successive pixels of one line of tertiary yellow data:

$$YEc_0=YEb_0$$

$$YEc_1=5/6 \cdot YEb_0+1/6 \cdot YEb_1$$

$$YEc_2=4/6 \cdot YEb_3+2/6 \cdot YEb_2$$

$$YEc_3=3/6 \cdot YEb_0+3/6 \cdot YEb_3$$

$$YEc_4=2/6 \cdot YEb_0+4/6 \cdot YEb_4$$

$$YEc_5=1/6 \cdot YEb_0+5/6 \cdot YEb_5$$

After completing pixel squaring of all pixels of the first line, the DSP 14 temporarily stores tertiary yellow data of the first line in the RAM 14b. Then, the DSP 14 reads out luminance data and color difference data of the second line from the DRAM 13, to produce tertiary yellow data of the second line through the RGB calculation, the complementary color conversion, the gradation conversion and the pixel squaring, in the same way as for the first line. The DSP 14 stores the tertiary yellow data of the second line in the RAM 14b, and then produces tertiary yellow data of the third line from luminance data and color difference data of the third line in the same way as for the first line. The DSP 14 represents the above operations until tertiary yellow data of a given number of lines necessary for sharpening is produced. In this embodiment, the sharpening is effected on the tertiary data according to the following formulas, wherein $YEc_{i,j}$ represents a tertiary yellow data value of one of 610×448 pixels, $YEd_{i,j}$ represents a quartic yellow data value of one of 610×448 pixels, and i (i=0 to 609) and j(j=0 to 447) represent the pixel position:

$$YEd_{i,j}=YEc_{i,j} \cdot 1.4$$

$$-YEc_{i+1,j} \cdot 0.1-YEc_{i-1,j} \cdot 0.1$$

$$-YEc_{i,j+1} \cdot 0.1-YEc_{i,j-1} \cdot 0.1$$

wherein $YEc_{-1, 0 \ldots 477}=0$;

$YEc_{610, 0 \ldots 477}=0$;

$YEc_{0 \ldots 609, -1}=0$;

$YEc_{0 \ldots 609, 448}=0$.

If $YEd_{i,j}>255$ in the above calculation, $YEd_{i,j}$ is set to be 255, and if $YEd_{i,j}<0$, $YEd_{i,j}$ is set to be 0.

Figure 6:
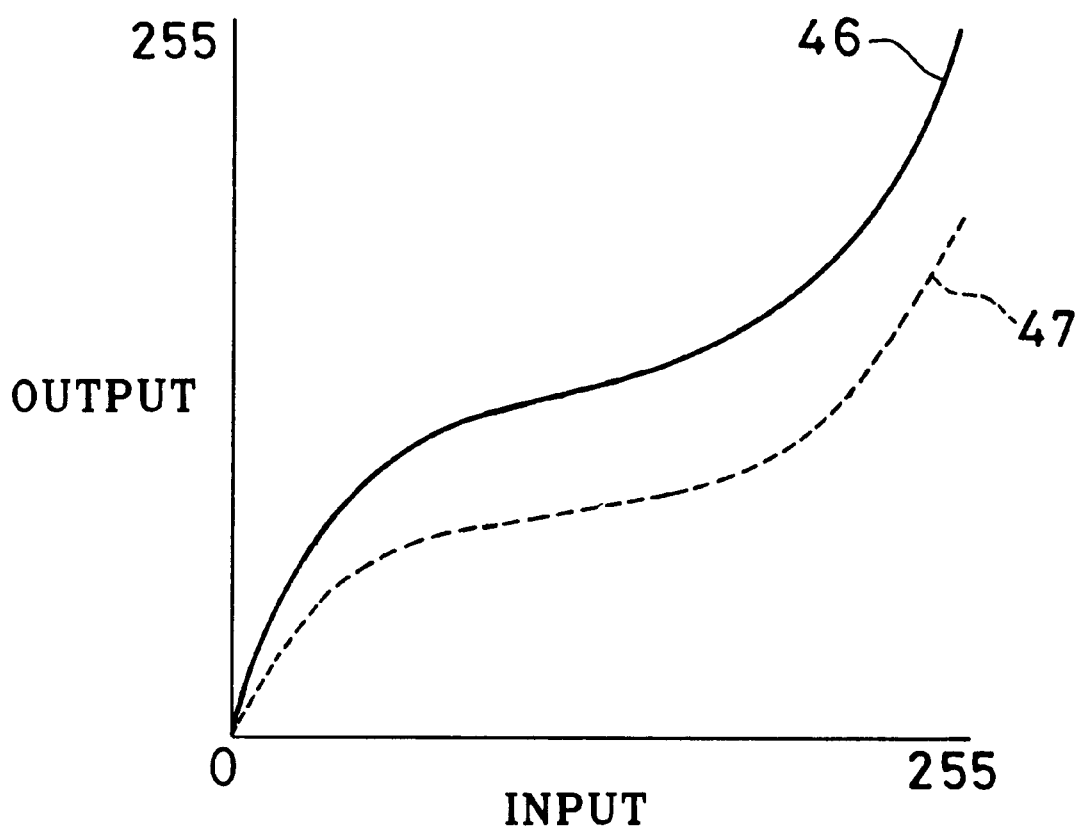
FIG. 6 is a graph illustrating gamma conversion curves corresponding to gamma conversion tables according to an embodiment of the invention.

Hereinafter, data obtained through the sharpening will be referred to as quartic data. After the sharpening of the tertiary yellow data of the first line, the DSP 14 selects one of the gamma conversion tables from the ROM 14a, for use in gamma correction of the quartic yellow data of the first line. When the recording paper 16 is of ordinary thermosensitive type, the DSP 14 selects a gamma conversion table corresponding to a conversion curve 46 as shown in FIG. 6, that considers yellow coloring characteristics of the ordinary thermosensitive recording paper. Data obtained through the gamma correction of the quartic yellow data of the first line is stored as yellow recording data of the first line in the RAM 14b. In the same way, the tertiary yellow data of the second and following lines is subjected to the sharpening and the gamma correction to produce yellow recording data of the second and following lines respectively.

When the yellow recording data has been stored for a predetermined number of lines in the RAM 14b, the DSP 14 reads out the yellow recording data of the first line from the RAM 14b, to send it to the head driver 18 through the memory controller 12 and the microcomputer 17. The head driver 18 drives the thermal head 15 to heat the heating elements of the array 15a in correspondence with the yellow recording data of the first line. Thus, the first line of the yellow frame is recorded on the recording paper 16. In the same way, the second and following lines of the yellow frame is recorded line after line.

After the yellow frame recording is complete, the DSP 14 starts data processing for magenta. The magenta data processing is conducted in the same way as the yellow data processing. First, green data is produced line by line from the luminance data and the color difference data stored in the DRAM 13 through the following RGB calculation:

$$G = Ya - (0.3 \cdot 1.14 \cdot 1.39/0.59) \cdot CRa$$
$$- (0.11 \cdot 2.03 \cdot 1.39/0.59) \cdot CBa \quad (8)$$

wherein
G is a green data value of one pixel; and
Ya, CBa and CRa represent the same as cited in the above equation (4).

If the masking process is not necessary, the green data of each pixel is calculated according to the following equation:

$$G = Ya - (0.3 \cdot 1.14/0.59) \cdot CRa$$
$$- (0.11 \cdot 2.03/0.59) \cdot CBa \quad (8')$$

The green data is converted into primary magenta data through complementary color conversion according to the following equation:

$$MA = 255 - G \quad (9)$$

wherein
MA is a value of primary magenta data of one pixel.

Thereafter, the DSP 14 converts the primary magenta data into secondary magenta data through the gradation conversion table selected according to the scene discrimination coefficient K, that is, the same table as used for the primary yellow data. The secondary magenta data is subjected to the pixel squaring, and the sharpening in the same way as the yellow data. For gamma correction, a gamma conversion table considering magenta coloring characteristics of the ordinary thermosensitive recording paper is selected. Magenta recording data obtained in this way is stored in the RAM 14b, and is sent to the head driver 18 line after line, to record the magenta frame line after line.

Cyan data processing for producing cyan recording data from the luminance data and color difference data stored in the DRAM 13 is carried out in the same way as the yellow and magenta recording data. To produce primary cyan data, the following RGB calculation and complementary color conversion are conducted:

$$R = Ya + (1.14 \cdot 1.382) \cdot CRa + (2.03 \cdot 0.1) \cdot CBa \quad (10)$$

$$CY = 255 - R \quad (11)$$

wherein
R is a red data value of one pixel;
CY is a value of primary cyan data of one pixel; and
Ya, CBa and CRa represent the same as cited in the above equation (4).

If the masking process is not necessary, the red data of each pixel is calculated according to the following equation:

$$R = Ya + 1.14 \cdot CRa + 0 \cdot CBa \quad (10')$$

The primary cyan data is converted into secondary cyan data through the same gradation conversion table selected according to the scene discrimination coefficient K as for yellow and magenta. The secondary cyan data is subjected to the pixel squaring and the sharpening in the same way as the yellow data. For gamma correction, a gamma conversion table considering cyan coloring characteristics of the ordinary thermosensitive recording paper is selected.

When the seal-type thermosensitive recording sheet 24 is selected as the recording paper 16 by the selector switch 14c, the DSP 14 conducts the same processing steps as above to obtain quartic data of one color frame. The difference is in that the quartic data obtained by the sharpening is temporarily stored in the RAM 14b and, thereafter, the DSP 14 composes yellow recording data for seal-printing from the quartic yellow data of one frame. To compose the yellow recording data for seal-printing, the DSP 14 reduces the frame size to be correspondent to one seal segment 24a of the seal-type recording sheet 24, and arranges the reduced frames of the identical image in a matrix, e.g. in a 4×4 matrix in this embodiment. The composed yellow recording data for seal-printing is stored in the RAM 14b.

Then, the DSP 14 reads out the composed yellow recording data one line after another, and subjects it to gamma correction. At that time, the DSP 14 selects a gamma conversion table corresponding to a conversion curve 47 as shown in FIG. 6, that considers yellow coloring characteristics of the seal-type thermosensitive recording sheet 24. The gamma corrected yellow recording data for the seal-printing is sent to the head driver 18 one line after another through the memory controller 12 and the microcomputer 17. Thus, the reduced yellow frames are recorded in the seal segments 24a in one-to-one relationship.

After the recording of the reduced yellow frames, the DSP 14 produces magenta recording data for seal-printing in the same way as for yellow. At that time, a gamma conversion table considering magenta coloring characteristics of the seal-type thermosensitive recording sheet 24 is selected for gamma correction.

After recording reduced magenta frames of the identical image in the individual seal segments 24a, the DSP 14 produces cyan recording data for seal-printing in the same way as for yellow. At that time, a gamma conversion table considering cyan coloring characteristics of the seal-type thermosensitive recording sheet 24 is selected for gamma correction.

As described so far, according to the invention, the gradation of the input image picked up by a video camera or entered through a video recorder is adapted not only to the printer characteristics but also to the coloring characteristic of the recording paper 16, and is corrected most properly in view of the luminance distribution of the input image signal.

EXAMPLES

Figure 7:
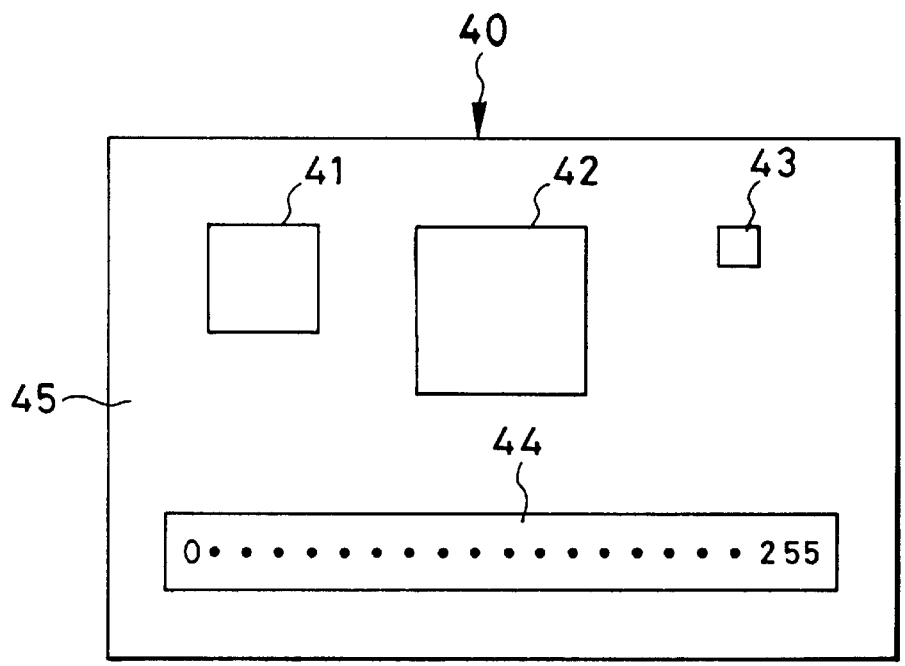
FIG. 7 is an explanatory view of a test chart.

Now the operation of the DSP 14 as above will be described more concretely with respect to a couple of examples using a test chart 40 as shown in FIG. 7, wherein it is assumed that the entire area of the test chart 40 is virtually divided into 600×400 pixels for picking up luminance data. A luminance histogram for calculating a scene discrimination coefficient K is produced from the luminance data of all of the 600×400 pixels. In the test chart 40, there are a first square area 41 consisting of 80×80 pixels, a second square area 42 consisting of 150×150 pixels, a third square area 43 consisting of 10×10 pixels, a fourth elongated rectangular area 44 consisting of 60×512 pixels, and a fifth or background area 45 surrounding the first to fourth areas 41 to 44.

Example 1

The luminance data of all pixels in the first area 41 has a value of "50" (luminance level Ey=50), the luminance data of all pixels in the second area 42 has a value of "180" (Ey=180), the luminance data of all pixels in the third area 43 has a value of "3" (Ey=3), and the luminance data of all pixels in the fifth area 45 has a value of "128" (Ey=128). The fourth area 44 is sectioned into 256 sub-areas arranged in a line, each sub-area consisting of 60×2 pixels and having a different luminance level from one another, sequentially changing from "0" to "255". That is, the fourth area 44 constitutes a gray scale.

Figure 8:
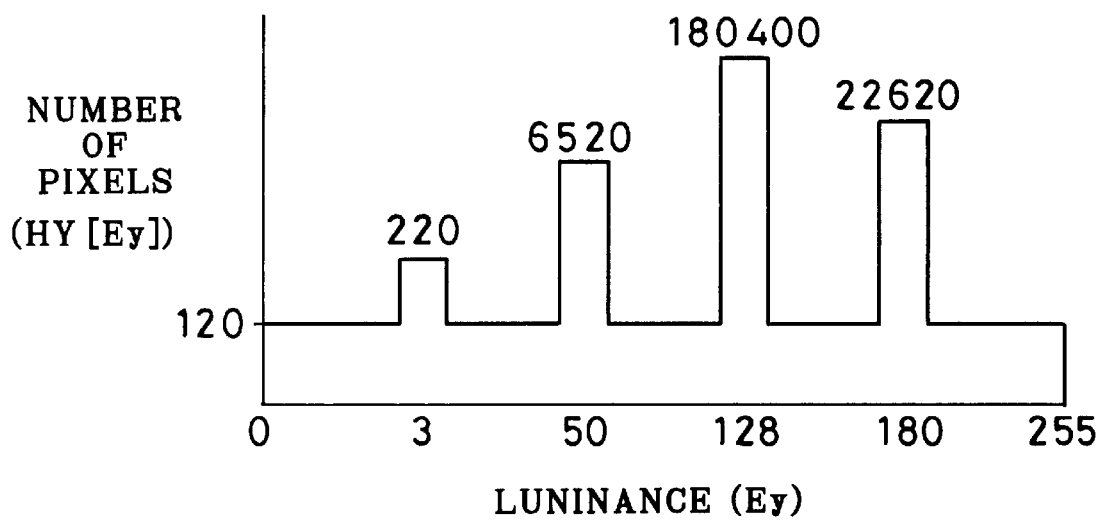
FIG. 8 is a graph illustrating a density histogram of the test chart.

FIG. 8 shows a luminance histogram of the test chart 40 having the luminance distribution of Example 1. As shown, HY[0] to HY[2]=120, HY[3]=220, HY[4] to HY[49]=120, . . . HY[180]=22620, HY[181] to HY[255]=120. Accordingly, HY[0]+HY[1]+HY[2]+HY[3]=580, and HY[0]+HY[1]+HY[2]+HY[3]+HY[4]=700. Since the value S1=600 in the above embodiment, the luminance level "4" is determined to be a black level Eb. On the other hand, since the value S2=200 in the above embodiment, and HY[255]+HY[254]=240, the luminance level "254" is determined to be a white level Ew.

Based on the black and white levels Eb=4 and Ew=254, a scene discrimination coefficient K is calculated according to the above formulas (1) to (3):

$$SUM1 = \Sigma\{HY[Ey] \cdot (Ey-4)\} = 26{,}624{,}120$$

wherein $4 \leq Ey \leq 254$ $$SUM2 = \Sigma\{120 \cdot (254-4)\} = 30{,}000$$

$$K = 2 \cdot (26{,}624{,}120 + 30{,}000)/(250 \cdot 600 \cdot 400) \approx 0.888$$

Therefore, the fifth gradation conversion table is selected. That is, the test chart 40 of Example 1 has the average luminance distribution. In that case, the secondary data obtained through the gradation conversion has the same values as the primary data.

Example 2

The luminance levels of the first to fourth areas 41 to 44 of the test chart 40 are respectively equal to those in Example 1, but the luminance level of the fifth area 45 is "100". That is, Example 2 is darker than Example 1 as the whole, though black and white levels Eb and Ew are respectively determined to be "4" and "254" also in Example 2. According to the formulas (1) to (3), the scene discrimination coefficient K for Example 2 is about 0.720, so that the fourth gradation conversion table is selected.

On the premise that the masking process is unnecessary for Example 2, and that all the pixels of the first area 41 have a red color difference data value CR of "130" and a blue color difference data value CB of "128", the RGB calculation for blue data of the first area 41 is carried out according to the equation (4'):

$$B = Ya + 2.03 \cdot CBa + 0 \cdot CRa$$

$$= (50-4) \cdot \{255/(254-4)\} + 2.03 \cdot (128-128) \cdot \{255/(254-4)\} \approx 46.92$$

According to the equation (5), YEa=255−B, primary yellow data of the first area 41 has a value "209". Since the fourth gradation conversion table is selected, the equation (6) is used for obtaining secondary yellow data:

$$255 - \{(255-209)/255\}^{0.92} \cdot 255 \approx 202$$

Therefore, the secondary yellow data of the first area 41 has a value "202". If the fifth gradation conversion table is selected, the secondary yellow data of the first area 41 would have the same value "209" as the primary yellow data. This means that the first area 41 is reproduced at the lower density or tonal level in Example 2 compared with Example 1, even through the original luminance level of the first area 41 is unchanged.

If all the pixels of the second area 42 have a red color difference data value CR of "128" and a blue color difference data value CB of "110", primary yellow data of the second area 42 has a value "113" according to the same calculations as used for the first area 41. The primary yellow data of value "113" is converted into secondary yellow data of value "106" through the fourth conversion table. Therefore, the second area 42 is also reproduced at the lower density or tonal level in Example 2 compared with Example 1.

If all the pixels of the third and fifth areas 43 and 45 have a red color difference data value CR of "128" and a blue color difference data value CB of "128", primary yellow data of the third area 43 has a value "255", whereas primary yellow data of the fifth area 45 has a value "158". Through the fourth conversion table, the primary yellow data of value "255" is converted into secondary yellow data of value "255", and the primary yellow data of value "158" is converted into secondary yellow data of value "150". Also, the fifth area 42 is reproduced at the lower density or tonal level in Example 2 compared with Example 1.

If all the pixels of the fourth area 44 have a red color difference data value CR of "128" and a blue color difference data value CB of "128", blue data of those pixels having the maximum luminance level of "255" has a value "256.02" according to the above RGB calculation. But the value "256.02" is corrected to "255" because of the 8-bit data format. The blue data of value "255" is converted into yellow primary data of value "0", and then into yellow secondary data of value "0".

In this way, the tonal levels of the hard copy of the text chart 40 of Example 2 are generally shifted toward the lower density side. Since more tonal steps are assigned to the low luminance side of the original image through the fourth conversion table, the continuously changing gradation of the fourth area 44 is reproduced with a natural gradation curve.

Although the above embodiment is provided with the gamma conversion tables separately from the gradation conversion tables, it is possible to provide composite conversion tables commonly for gradation modification and gamma correction. In that case, it is of course necessary to provide such a composite conversion table for each color on each type of color recording paper. This embodiment is preferable to reduce the number of conversion steps.

Figure 9:
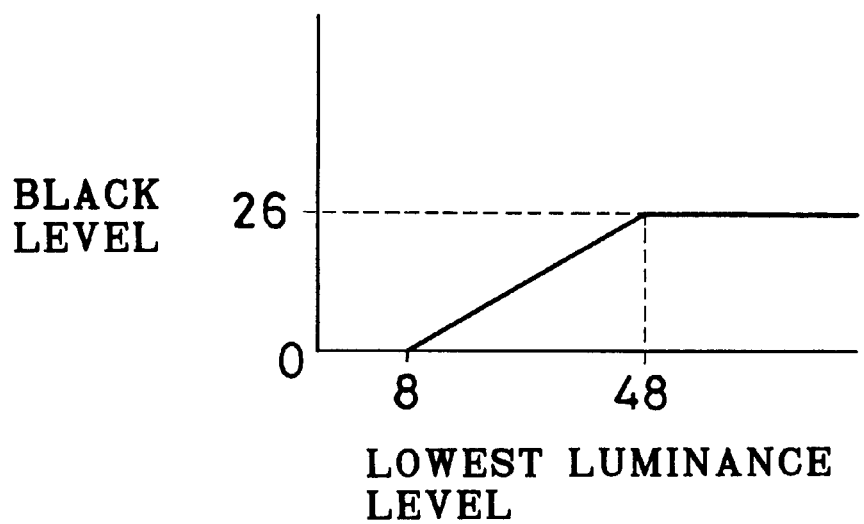
FIG. 9 is a black level correction curve according to another embodiment of the invention.
Figure 10:
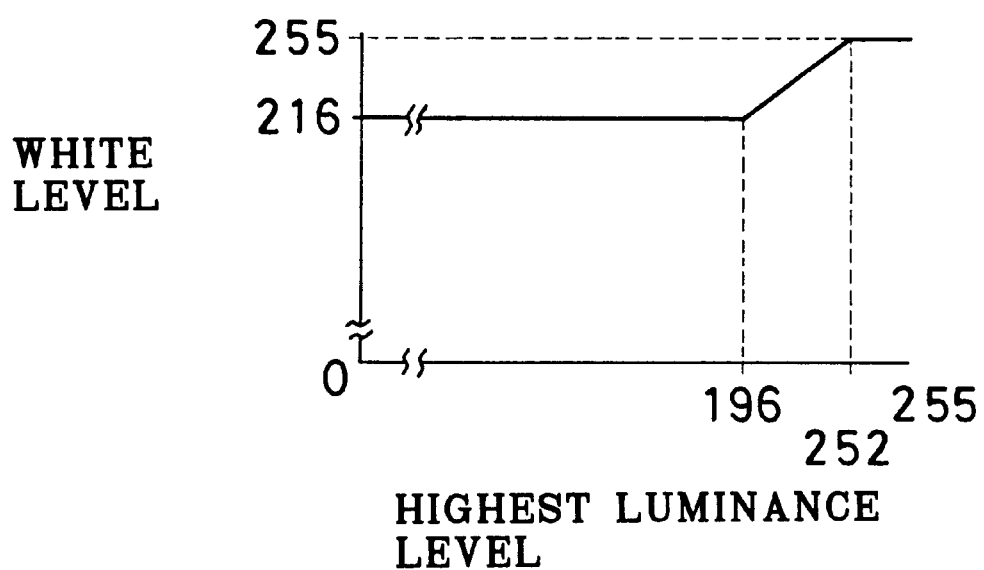
FIG. 10 is a white level correction curve according to another embodiment of the invention.

Instead of determining black and white levels Eb and Ew based on the accumulation result S of the frequencies HY[Ey] of the luminance levels Ey, it is possible to use correction curves as shown in FIGS. 9 and 10. In that case, the DSP 14 first detects a highest luminance level and a lowest luminance level among those luminance levels where the frequency HY[Ey] is not less than "1" in the luminance histogram.

Thereafter, the lowest luminance level is converted into a black level Eb through the black level correction curve of FIG. 9, and the highest luminance level is converted into a white level Ew through the white level correction curve of FIG. 10. It is to be noted that the black and white level correction curves shown in FIGS. 9 and 10 are mere examples, and are not limitative.

Figure 11:
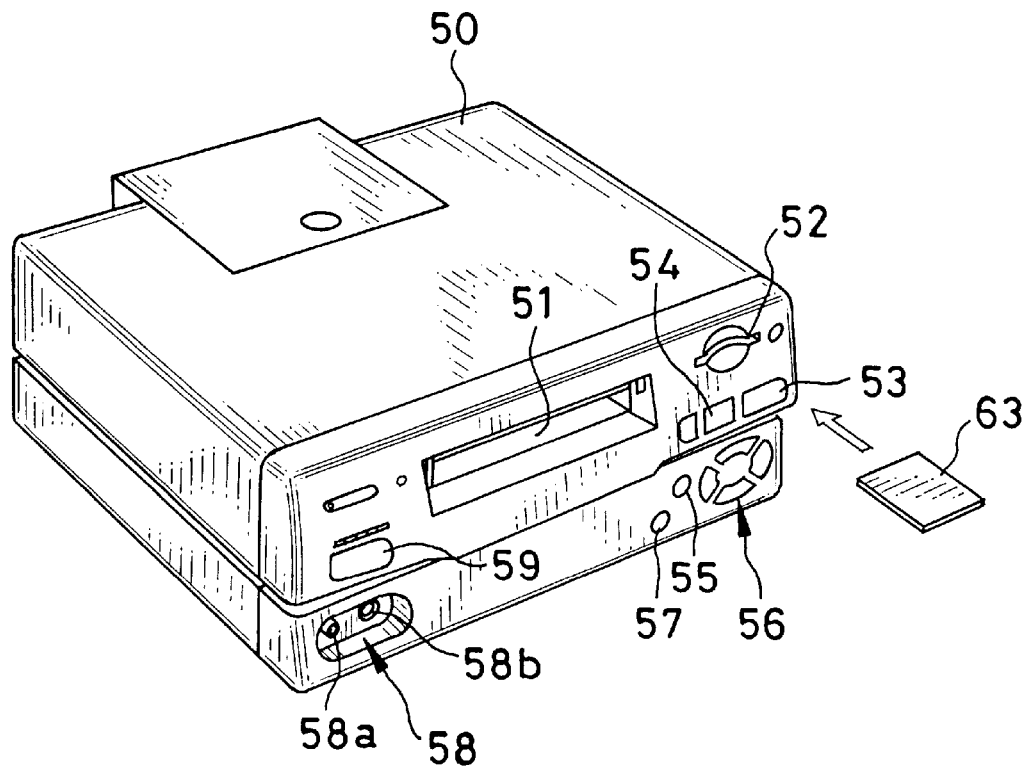
FIG. 11 is a front perspective view of a printer according to a preferred embodiment of the invention.
Figure 12:
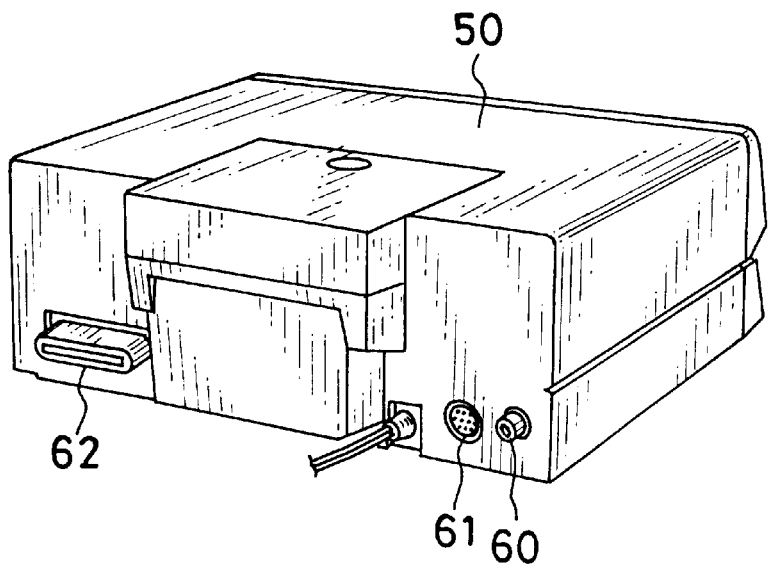
FIG. 12 is a rear perspective view of the printer shown in FIG. 11.
Figure 13:
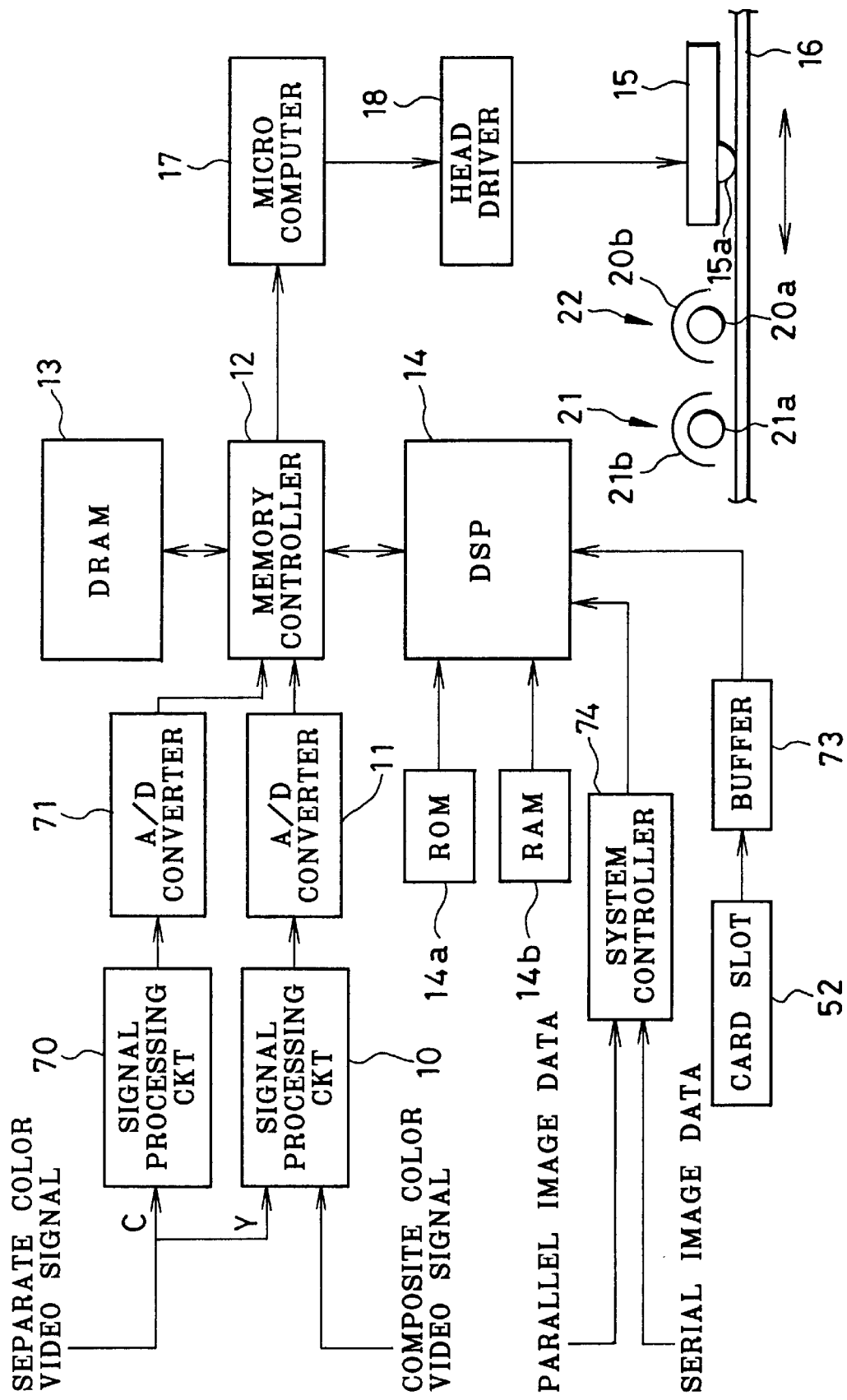
FIG. 13 is a circuit diagram of the printer shown in FIGS. 11 and 12.

FIGS. 11 to 13 shows a printer 50 according to a second embodiment of the invention, which can make a hard copy of a full-color half-tone image based on separate color video signal, of which analog luminance signal is separated from analog chrominance signal, and digital image data stored in a computer or an IC memory card, as well as the composite color video signal. As the circuitry of the second embodiment is fundamentally equivalent to the first embodiment, the following description will relate only to those features essential to the second embodiment.

As shown in FIG. 11, the printer 50 is provided with a paper slot 51, a card slot 52, a print button 53, a memory button 54, a menu button 55, a direction key 56, a display mode change button 57, a video input terminal 58, an input mode change button 59, and so forth on the front side thereof. On the rear side of the printer 50, as shown in FIG. 12, there are a video output terminal 60, a serial input terminal 61 and a parallel input terminal 62.

Through the paper slot 51, a color recording paper 16 is fed into the printer 50 and, after having an image recorded thereon, the color recording paper 16 is fed out of the printer 50. The card slot 52 is for inserting an IC memory card 63. The IC memory card 63 can be written by digital cameras and computers, and stores RGB image data of a plurality of images in a compressed fashion.

The video input terminal 58 is so-called S-terminal consisting of first and second input terminals 58a and 58b. The printer 50 receives the composite color video signal composed of chrominance signals, luminance signal and synchronizing signals through the first input terminal 58a. The luminance signal of the separate color video signal is entered through the first input terminals 58a, while the chrominance signals of the separate color video signal are entered through the second input terminal 58b. The input mode change button 59 is operated to switch over the input mode between the compressed image data from the IC memory card 63, the composite color video signal and the separate color video signal.

To enter the image data from an external computer, the computer is connected to the serial input terminal 61 or the parallel input terminal 62. The serial input terminal 61 is of RS422A type, a standardized serial interface, so a serial port of an adaptable computer is connected to the serial input terminal 61 to feed in image data in a serial fashion. On the other hand, the parallel input terminal 62 is of IEEE 1284 type, so a parallel port of an adaptable computer is connected to the parallel input terminal 62 to feed in image data in a parallel fashion. The image data from the computer is RGB image data.

The video output terminal 60 is for connection to a monitor, such as a TV, for displaying video images being entered as the analog video signal through the video input terminal 58, or alternatively a still image stored in a DRAM 13. The display mode changing button 57 is operated to select between the video image and the still image to display. By operating the menu button 55, a variety of menus are displayed on the monitor connected to the video output terminal 60, for allowing the operator to set up the printer 50 appropriately. As one menu, the operator can designate a seal-printing through the direction key 57.

FIG. 13 shows the circuitry of the printer 50. Further to the circuits shown in FIG. 13, there are a circuit for outputting video signal through the video output terminal 60, a control circuit for controlling respective portions of the printer 50 in accordance with set-up conditions of the printer 50, a variety of switches for setting up the printer conditions, and so forth, though they are omitted from the drawings.

The composite color video signal entered through the first input terminal 58a is processed in a signal processing circuit 10, and luminance and color difference data obtained therefrom is processed in a DSP 14 in the same way as in the first embodiment.

When the luminance signal of the separate color video signal is entered through the first input terminal 58a, the signal processing circuit 10 eliminates unnecessary components such as the synchronizing signals, and outputs the luminance signal to an A/D converter 11. Luminance data thus obtained is written in the DRAM 13 through a memory controller 12. On the other hand, the chrominance signal entered through the second input terminal 58b is processed in a signal processing circuit 70. The signal processing circuit 70 separates the chrominance signals into red signal and blue signal. The red and blue signals are respectively converted into red data and blue data through an A/D converter 71, and the red and blue data is written in the DRAM 13 through the memory controller 12.

The DSP 14 calculates a scene discrimination coefficient K based on the luminance data. The DSP 14 also produces red color difference data and blue color difference data from the luminance data, the red data and the blue data obtained from the separate color video signal and stored in the DRAM 13. Based on the red color difference data, the blue color difference data and the luminance data, the DSP 14 records a full-color half-tone image in a frame sequential fashion, in the same way as the first embodiment.

It is possible to obtain primary cyan data and primary yellow data directly from the red data and the blue data respectively through the complementary color conversion, without producing red color difference data and blue color difference data. In that case, primary magenta data is produced from the luminance data, the red data and the blue data.

To make a hard copy of an image stored in the IC memory card 63, the compressed image data is read out from the IC memory card 63 through the card slot 52, and is sent to the DSP 14 through a buffer 73. The DSP 14 expands the compressed image data to restore the original RGB data. Thereafter, the DSP 14 derives luminance data of each pixel from the RGB image data of each pixel by an appropriate operation, and calculates a scene discrimination coefficient K based on the luminance data. The image RGB data is also converted into primary cyan, magenta and yellow data through complementary color conversion, and subjected to the gradation conversion in accordance with the scene discrimination coefficient K.

The RGB image data entered through the serial or the parallel input terminal 61 or 62 is sent through a system controller 74 to the DSP 14, and is processed in the same way as the RGB image data reproduced from the compressed image data from the IC memory card 63. It is to be noted that the secondary data obtained through the gradation conversion is not subjected to the pixel squaring concerning the image data from the IC memory card 63 and the computer.

Although the present invention has been described with reference to the embodiments using thermosensitive recording materials, the present invention is applicable to other type printers such as thermal ink-transfer type printers, ink-jet printers and so forth. The number of gradation conversion tables and their characteristic curves are not to be limited to the above embodiment. It is also possible to conduct the conversion steps through mathematic operations instead of the conversion tables.

Thus, the present invention is not to be limited to the above described embodiments but, on the contrary, various modifications will be possible to those skilled in the art without departing from the scope of claims attached hereto.

What is claimed is:

1. An image processing method of a printer for printing a half-tone image on a recording material based on an image signal, comprising the steps of:
   producing a luminance histogram showing frequencies of respective luminance levels from the image signal;
   determining a black luminance level and a white luminance level based on the luminance histogram;
   assigning the black luminance level and the white luminance level respectively to a relatively darkest tonal level and a relatively lightest tonal level of an available gradation range for printing;
   calculating a scene discrimination coefficient based upon frequencies of individual luminance levels of the image signal, and luminance coefficients determined according to the individual luminance levels and the determined black and white luminance levels, respectively assigned to the relatively darkest and relatively lightest tonal levels;
   determining a gradation conversion curve based upon the determined scene discrimination coefficient; and
   assigning the respective luminance levels of the image signal to tonal levels ranging from the relatively darkest tonal level to the relatively lightest tonal level, according to the determined gradation conversion curve.

2. An image processing method as claimed in claim 1, further comprising the step of
   gamma correcting the image signal to adjust tonal levels in accordance with coloring characteristics of the recording material used for printing.

3. An image processing method as claimed in claim 1, wherein a value proportional to a difference between the black luminance level and each luminance level is used as the luminance coefficient for luminance levels ranging from the black luminance level to the white luminance level, a value proportional to a difference between the black luminance level and the white luminance level is used as the luminance coefficient for luminance levels above the white luminance level, and a value of zero is used as the luminance coefficient for luminance levels below the black luminance level.

4. An image processing method as claimed in claim 1, wherein when the scene discrimination coefficient is within a predetermined range, the gradation conversion curve is carried out according to a linear conversion curve; when the scene discrimination coefficient is below the predetermined range, the gradation conversion curve is carried out according to a non-linear conversion curve which shifts the tonal levels between the black and white luminance levels toward a relatively lower density side, allotting more tonal steps to a relatively higher density range; and when the scene discrimination coefficient is above the predetermined range, the gradation conversion curve is carried out according to a non-linear conversion curve which shifts the tonal levels between the black and white luminance levels toward a relatively higher density side, allotting more tonal steps to a relatively lower density range.

5. An image processing method as claimed in claim 4, wherein the relatively smaller the scene discrimination coefficient, the relatively greater the number of tonal steps allotted to the higher density range, and the relatively larger the scene discrimination coefficient, the relatively greater the number of tonal steps allotted to the lower density range.

6. An image processing method as claimed in claim 1, wherein the black luminance level is determined by the steps of:
   accumulating the frequencies of the luminance histogram from relatively lowest to relatively higher luminance levels;
   comparing each accumulation result with a given first value; and
   determining, when the accumulation result goes above the given first value, the luminance level having a last accumulated frequency as the black luminance level.

7. An image processing method as claimed in claim 1, wherein the white luminance level is determined by the steps of:
   accumulating the frequencies of the luminance histogram from relatively highest to relatively lower luminance levels;
   comparing each accumulation result with a given second value; and
   determining, when the accumulation result goes above the given second value, the luminance level having a last accumulated frequency as the white luminance level.

8. An image processing method as claimed in claim 7, wherein if the black luminance level is greater than a predetermined low luminance level, the black luminance level is corrected to the predetermined low luminance level, and wherein if the white luminance level is less than a predetermined high luminance level, the white luminance level is corrected to the predetermined high luminance level.

9. An image processing method as claimed in claim 1, wherein the black luminance level and the white luminance level are determined by the steps of:
   detecting a relatively lowest luminance level and a relatively highest luminance level of the image signal from the luminance histogram;
   converting the relatively lowest luminance level to the black luminance level through a predetermined black luminance level correction curve; and
   converting the relatively highest luminance level to the white luminance level through a predetermined white luminance level correction curve.

10. A printer which prints a half-tone image on a recording material based on image signal entered through an image input device, comprising:

means for producing a luminance histogram showing frequencies of respective luminance levels from the image signal;

means for determining a black luminance level and a white luminance level based on the luminance histogram;

means for assigning the black luminance level and the white luminance level respectively to a relatively darkest tonal level and a relatively lightest tonal level of an available gradation range for printing;

means for calculating a scene discrimination coefficient based upon frequencies of individual luminance levels of the image signal, and luminance coefficients determined according to the individual luminance levels and the determined black and white luminance levels, respectively assigned to the relatively darkest and relatively lightest tonal levels; and means for assigning the respective luminance levels of the image signal to tonal levels ranging from the relatively darkest tonal level to the relatively lightest tonal level according to a gradation conversion curve determined based upon the determined scene discrimination coefficient.

11. A printer as claimed in claim 10, further comprising means for storing a plurality of predetermined gradation conversion tables, one of which is selected in accordance with the scene discrimination coefficient.

12. A printer as claimed in claim 10, further comprising means for designating a type of recording material to print the image thereon, and gamma correction means for adjusting tonal levels in accordance with coloring characteristics of the designated type of recording material.

13. A printer as claimed in claim 12, further comprising means for storing a plurality of predetermined gamma conversion tables, one of which is selected in accordance with the type of the designated recording material.

14. A printer as claimed in claim 13, wherein when a seal-type recording material is designated, an image frame composed of a plurality of identical images is produced from the image signal in accordance with arrangement of seal segments on the seal-type recording material.

15. A printer as claimed in claim 10, wherein the image input device includes an analog video signal input device, a digital image signal input device, and a data reading device for reading image data from an external memory.

* * * * *